United States Patent
Day, III et al.

(10) Patent No.: US 6,865,642 B2
(45) Date of Patent: Mar. 8, 2005

(54) METHOD AND APPARATUS FOR DISK CACHING FOR AN INTERMEDIARY CONTROLLER

(75) Inventors: Kenneth Fairclough Day, III, Tucson, AZ (US); Douglas William Dewey, Tucson, AZ (US); Norman Iwao Hanami, San Jose, CA (US); Dean Lee Hanson, Tucson, AZ (US); David Allan Pease, Redwood Estates, CA (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 09/103,701

(22) Filed: Jun. 24, 1998

(65) Prior Publication Data

US 2001/0011325 A1 Aug. 2, 2001

(51) Int. Cl.$^7$ .......................... G06F 12/00; G06F 13/00
(52) U.S. Cl. ...................... 711/113; 711/100; 711/154; 711/163
(58) Field of Search .................. 711/113, 168, 711/169, 100, 154, 167

(56) References Cited

U.S. PATENT DOCUMENTS

| | | | |
|---|---|---|---|
| 5,146,578 A | | 9/1992 | Zangenehpour |
| 5,212,781 A | * | 5/1993 | Shah .................... 711/167 |
| 5,276,848 A | | 1/1994 | Gallagher et al. |
| 5,355,467 A | * | 10/1994 | MacWilliams et al. ..... 711/146 |
| 5,426,761 A | | 6/1995 | Cord et al. |
| 5,493,668 A | | 2/1996 | Elko et al. |
| 5,499,354 A | | 3/1996 | Aschoff et al. |
| 5,504,882 A | | 4/1996 | Chai et al. |
| 5,526,482 A | * | 6/1996 | Stallmo et al. ............. 714/6 |
| 5,542,066 A | | 7/1996 | Mattson et al. |
| 5,568,628 A | | 10/1996 | Satoh et al. |
| 5,627,990 A | | 5/1997 | Cord et al. |
| 5,636,359 A | | 6/1997 | Beardsley et al. |

(List continued on next page.)

OTHER PUBLICATIONS

IBM Technical Disclosure Bulletin, 27 (1A): 334–337 (Jun. 1984).*

IBM® Technical Disclosure Bulletin, 27(1A):334–337 (Jun. 1984).

*Primary Examiner*—Tuan V. Thai
(74) *Attorney, Agent, or Firm*—Crawford Maunu PLLC

(57) ABSTRACT

A disk caching method for an intermediary controller is disclosed. Requests for data blocks are made and then disk caching is performed according to a most expedient cache method. The disk caching method may be performed by asynchronously requesting a data record from both a intermediary controller disk storage and from a intermediary controller cache and using a first received copy of the data record, the first received copy being a copy received first from the intermediary controller disk storage. Alternatively, the disk caching may be performed by searching an intermediary controller cache to determine whether requested data is located in the cache of the intermediary controller, searching a storage device of the intermediary controller to determine whether requested data is located in the storage device of the intermediary controller and retrieving the requested data from a disk controller coupled to the intermediary controller when the requested data is not in the cache or storage device of the intermediary controller. The intermediary controller maintains a cache hit ratio for cache in a disk controller cache and chooses a cache method based upon a comparison of the hit ratio to the threshold. The intermediary controller selects an item to replace in the intermediary controller cache, moves data into the intermediary controller cache, determines whether the hit ratio of the disk controller is greater than the threshold and moves the item into the intermediary controller storage device when the hit ratio of the disk controller cache is greater than the threshold. The intermediary controller discards the item form the cache of the intermediary controller when the hit ratio of the disk controller is not greater than the threshold.

28 Claims, 5 Drawing Sheets

U.S. PATENT DOCUMENTS

| | | |
|---|---|---|
| 5,649,153 A | 7/1997 | McNutt et al. |
| 5,682,522 A * | 10/1997 | Huang et al. ................... 711/3 |
| 5,734,859 A * | 3/1998 | Yorimitsu et al. ........... 711/112 |
| 5,778,430 A * | 7/1998 | Ish et al. .................... 711/133 |
| 5,809,560 A * | 9/1998 | Schneider .................... 711/204 |
| 5,829,024 A * | 10/1998 | Sato ........................... 711/122 |
| 5,991,852 A * | 11/1999 | Bagley ....................... 711/112 |

\* cited by examiner

METHOD AND APPARATUS FOR DISK CACHING FOR AN INTERMEDIARY CONTROLLER

BACKGROUND OF THE INVENTION

1. Field of the Invention

This invention relates in general to storage systems, and more particularly to a method and apparatus for disk caching for an intermediary controller.

2. Description of Related Art

Computing systems frequently are provided with storage subsystems having multiple storage devices connected to the computing system central processor through a device controller. For example, some computing systems include a plurality of disks arranged into a disk array with parity and sparing. Parity refers to organizing data into parity groups such that each modification of disk data that involves a relatively small write operation requires a read old data, read old parity, write new data, write new parity sequence of operations often referred to as a read-modified-write sequence. Sparing refers to providing spare data blocks to be used in the event of a disk failure.

A disk array controller is provided between the disk array and the computing system central processor unit (CPU) and includes a nonvolatile cache memory. A cache memory provides a fast, limited-size temporary storage for data and can reduce the number of times a disk must be accessed to retrieve a requested data block. As applications running in the central processor unit requests blocks of data from the disk array, the disk array controller checks a cache directory to determine if a copy of the requested data block is in the cache memory of the controller. If the disk array controller determines that the cache memory contains the most recent copy of the data block, referred to as a cache hit, then the controller provides the data block to a requesting application from the cache memory rather than from the particular disk where the data block is located.

If the most recent copy of the data block is not in the cache memory, referred to as a cache miss, then the disk array controller consults the cache memory directory to find a cache memory location containing a block that can be replaced, or overwritten, because the data in that location also resides on a disk. The controller reads a copy of the requested data block from the disk and puts it in the cache memory location to be overwritten. Lastly, the controller updates the cache directory to indicate that the old data block is no longer in the cache memory location and that the new data block has taken its place. Once the new data block is in the cache memory, it can be modified and updated.

Disk arrays with cache memory are desirable because they increase efficiency of expensive computing systems by reducing the number of times data blocks must be accessed from a disk. Accesses of data from a disk are typically slower than accesses of data from a cache memory. Therefore, getting data from a cache memory permits a computing system to carry out processing faster than is possible when getting the data from disk. This increased deficiency reduced the cost of operations.

However, new disk controllers are being developed wherein the new controller is inserted between a host system and a legacy disk controller to allow new host types to use legacy disk controllers and storage devices. Thus, these new controllers act as an intermediary between hosts and controller units. These intermediary controllers also provide additional caching.

Nevertheless, intermediary controllers present an interesting multi-level cache scenario. Data may be cached in the intermediate controller, in a hard disk of the intermediary controller, or in a disk controller cache. Access to the intermediary controller hard disk takes longer than a hit in the disk controller cache, yet access to the intermediary controller hard disk is still much faster than a read from a disk of the disk controller. The intermediary controller hard disk is also much larger than the disk controller cache.

Accordingly, the access to the intermediary controller hard disk is more costly than a level lower than it. Thus, the performance appears as if two levels have been swapped in a multilevel cache, i.e., the slower but larger one is higher in the hierarchy.

As a result, the best use of the intermediary controller cache must be addressed. One view is to always use the intermediary controller hard disk and process hits from there instead of going to the disk controller. This would mean some hits could have been faster by being in the disk controller cache. However, this would also avoid the slower legacy disk accesses. Hence it would work to smooth overall performance with a possible penalty in some scenarios. The opposite approach is to not process hits via the intermediary controller hard disk at all and rely on the disk controller cache entirely. Obviously scenarios can be found for which one of the above policies is best, but predicting work loads and configurations is difficult.

It can be seen then that there is a need for a method and apparatus for disk caching in an intermediary controller that will utilize the hardware best for varying scenarios.

It can also be seen that there is a need for a method and apparatus for disk caching in an intermediary controller that is based on system performance.

SUMMARY OF THE INVENTION

To overcome the limitations in the prior art described above, and to overcome other limitations that will become apparent upon reading and understanding the present specification, the present invention discloses a method and apparatus for disk caching.

The present invention solves the above-described problems by providing a method and apparatus for disk caching in an intermediary controller which best utilizes storage system hardware for varying scenarios and which is based on system performance.

A intermediary disk caching method in accordance with the principles of the present invention includes asynchronously requesting a data record from both a intermediary controller disk storage and from a intermediary controller cache and using a first received copy of the data record, the first received copy being a copy received first from the intermediary controller disk storage or a copy received from the disk controller cache.

Other embodiments of a system in accordance with the principles of the invention may include alternative or optional additional aspects. One such aspect of the present invention is that the method includes searching an intermediary controller cache to determine whether requested data is located in the cache of the intermediary controller, searching a storage device of the intermediary controller to determine whether requested data is located in the storage device of the intermediary controller and retrieving the requested data from a disk controller coupled to the intermediary controller when the requested data is not in the cache or storage device of the intermediary controller.

Another aspect of the present invention is that the method further includes retrieving the requested data from the cache of the intermediary controller when the requested data is located in the cache of the intermediary controller.

Another aspect of the present invention is that the method further includes retrieving the requested data from the storage device of the intermediary controller when the requested data is located in the storage device of the intermediary controller.

Another aspect of the present invention is that the method further includes asynchronously requesting the requested data from both a intermediary controller disk storage and from a intermediary controller cache when the requested data is located in the storage device of the intermediary controller and using a first received copy of the data record, the first received copy being a copy received first from the intermediary controller disk storage or a copy received from the disk controller cache.

Another aspect of the present invention is that the method further includes retrieving the requested data from the storage device of the intermediary controller when the requested data is located in the storage device of the intermediary controller.

Another aspect of the present invention is that the method further includes maintaining a cache hit ratio for cache in a disk controller cache and choosing a cache method based upon a comparison of the hit ratio to the threshold.

Another aspect of the present invention is that the method further includes selecting an item to replace in the intermediary controller cache, moving data into the intermediary controller cache, determining whether the hit ratio of the disk controller is greater than the threshold and moving the item into the intermediary controller storage device when the hit ratio of the disk controller cache is greater than the threshold.

Another aspect of the present invention is that the method further includes discarding the item form the cache of the intermediary controller when the hit ratio of the disk controller is not greater than the threshold.

Another aspect of the present invention is that the method further includes returning the data to the host.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for disk caching in an intermediary controller which best utilizes storage system hardware for varying scenarios and which is based on system performance.

Figure 1:
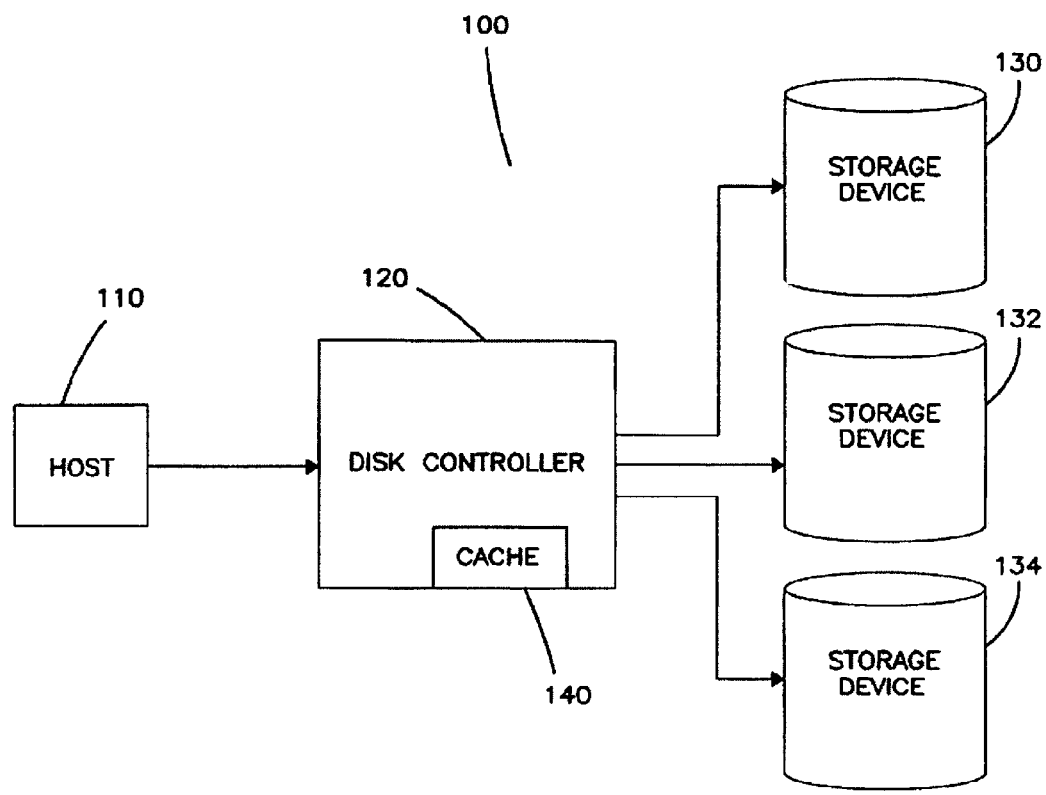
FIG. 1 illustrates a conventional storage system.

FIG. 1 illustrates a conventional storage system 100. In FIG. 1, a host 110 is coupled to a disk controller 120. The disk controller 120 receives data requests from the host 110 and accesses direct storage devices (DASD) 130, 132, 134. DASDs are one type of auxiliary storage device. In a DASD, access time to data is independent of the location of the data and the storage device. Currently, disk drive units are the most common type of DASD. A disk drive unit records data on a rotatable disk. The write and read transducers are moved readily inward and outward relative to the disk and the disk is rotated to bring any location of the disk and appropriate transducer into proximity with one another. A track is a 360° rotation for a given disk. A cylinder is a vertical band of tracks and there are typically many tracks within a cylinder.

The disk controller 120 includes a cache or memory 140 wherein data may be immediately accessed by the host 110. This is in contrast to accessing data in the DASD 130, 132, 134, which requires alignment of the transducer and a data block stored in the DASD 130, 132, 134.

Figure 2:
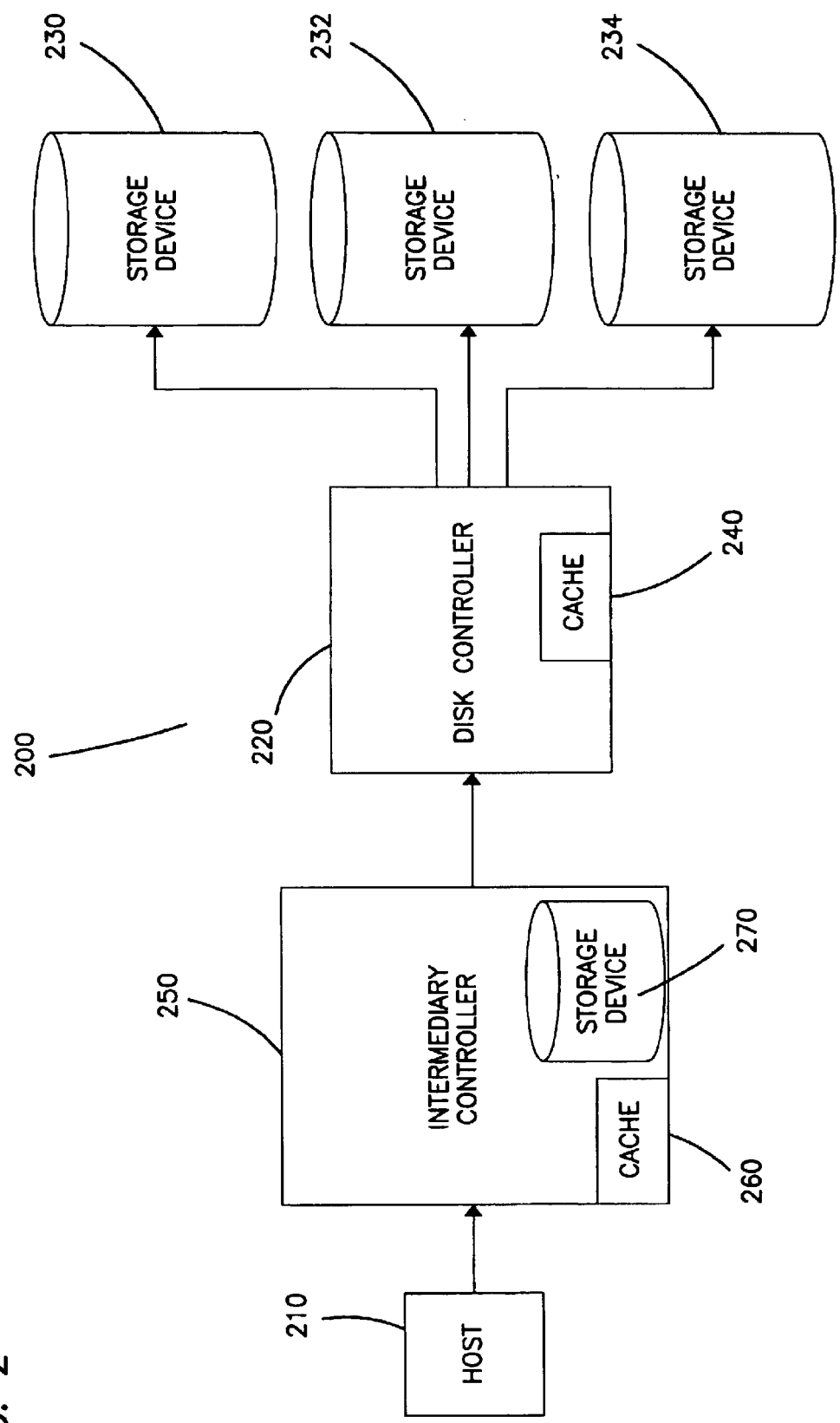
FIG. 2 illustrates a storage system according to the present invention.

FIG. 2 illustrates a storage system 200 according to the present invention. In FIG. 2, a host 210 is able to command a disk controller 220 to access data stored in direct access storage devices (DASD) 230, 232, 234. Disk controller 220 also includes a cache 240. Positioned between the host 210 and the controller 220 is an intermediary controller or storage controller 250. The intermediary controller 250 includes a cache 260 and disk storage 270. The intermediary controller 250 provides a means whereby the host 210 can control legacy disk controllers 220 and storage devices 230, 232, 234. The intermediary controller 250 also provides additional caching 260. However, since the access to the intermediary controller disk storage 270 takes longer than a hit in the cache 240 of the disk controller 220, but which is still much faster than a read from the storage devices 230, 232, 234, a more expedient method of controlling the disk cache 260 of the intermediary controller 250 is required.

Figure 3:
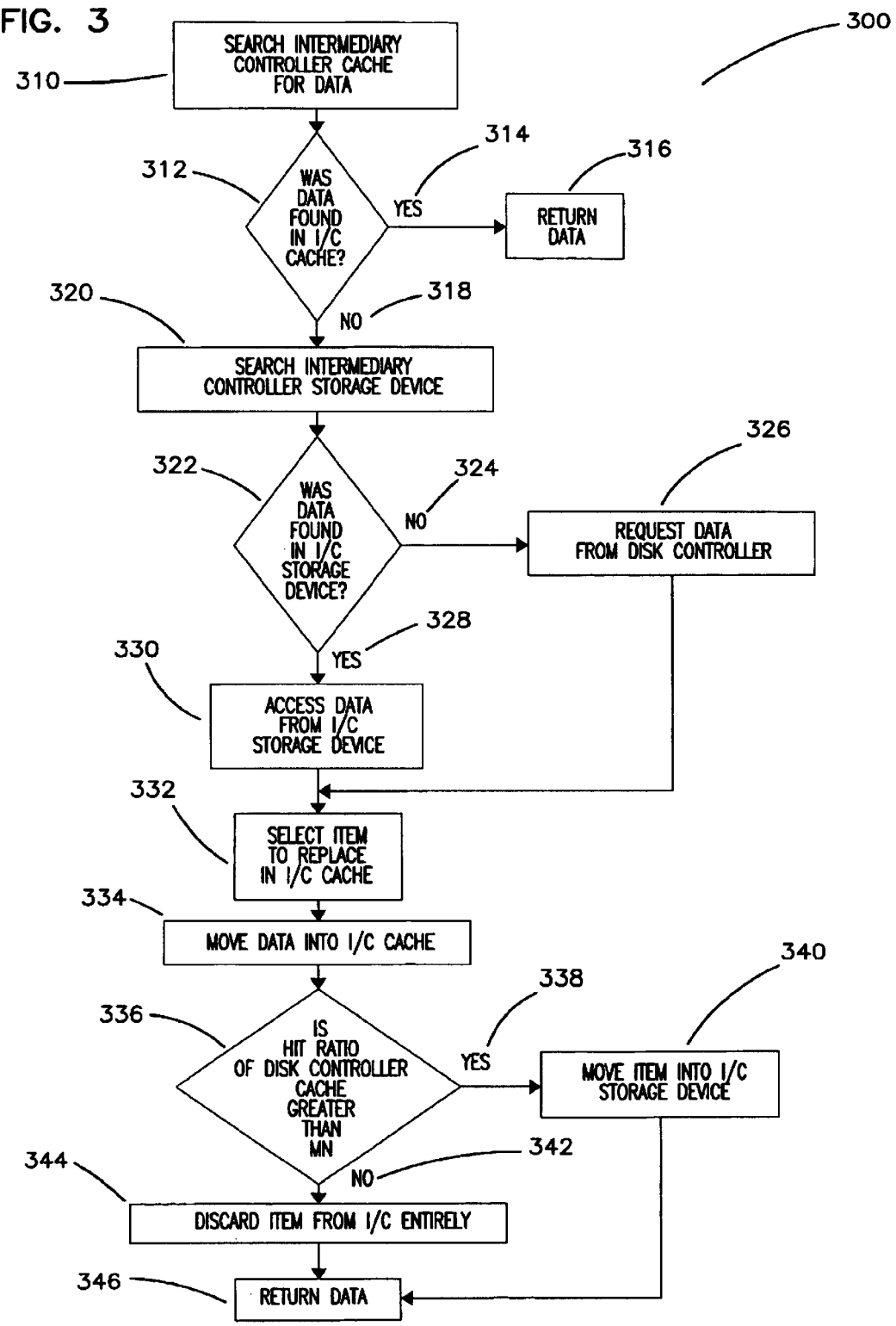
FIG. 3 illustrates a flow chart of one embodiment of an expedient disk caching method according to the present invention.

FIG. 3 illustrates a flow chart of one embodiment 300 of an expedient disk caching method according to the present invention. In FIG. 3, the intermediary controller cache is first searched 310 to determine whether the requested data is located in the cache of the intermediary controller. A determination is made as to whether the requested data is located in the intermediary controller cache 312. If the data is located in intermediary controller cache 314, then the data is returned 316. If the data is not located in the intermediary controller cache 318, then the storage device of the intermediary controller is searched 320.

A determination is made as to whether the requested data is located in the intermediary controller storage device 322. If the data is not located in intermediary controller storage device 324, the data is requested from the legacy disk controller 326. If the data is located in the intermediary controller storage device 328, then the data is accessed from the intermediary controller storage device 330.

Next, an item is selected to replace in the intermediary controller cache 332. The data is moved into the intermediary controller cache 334. A cache hit ratio is maintained for the disk controller cache and the cache hit ratio is compared to a threshold MN 336. If the hit ration of the disk controller cache is greater than the threshold 338, the item is moved into the intermediary controller storage device 340. If the hit ration of the disk controller cache is not greater than the threshold 342, the item is discarded from the intermediary controller entirely 344. Then the data is returned 346.

Figure 4:
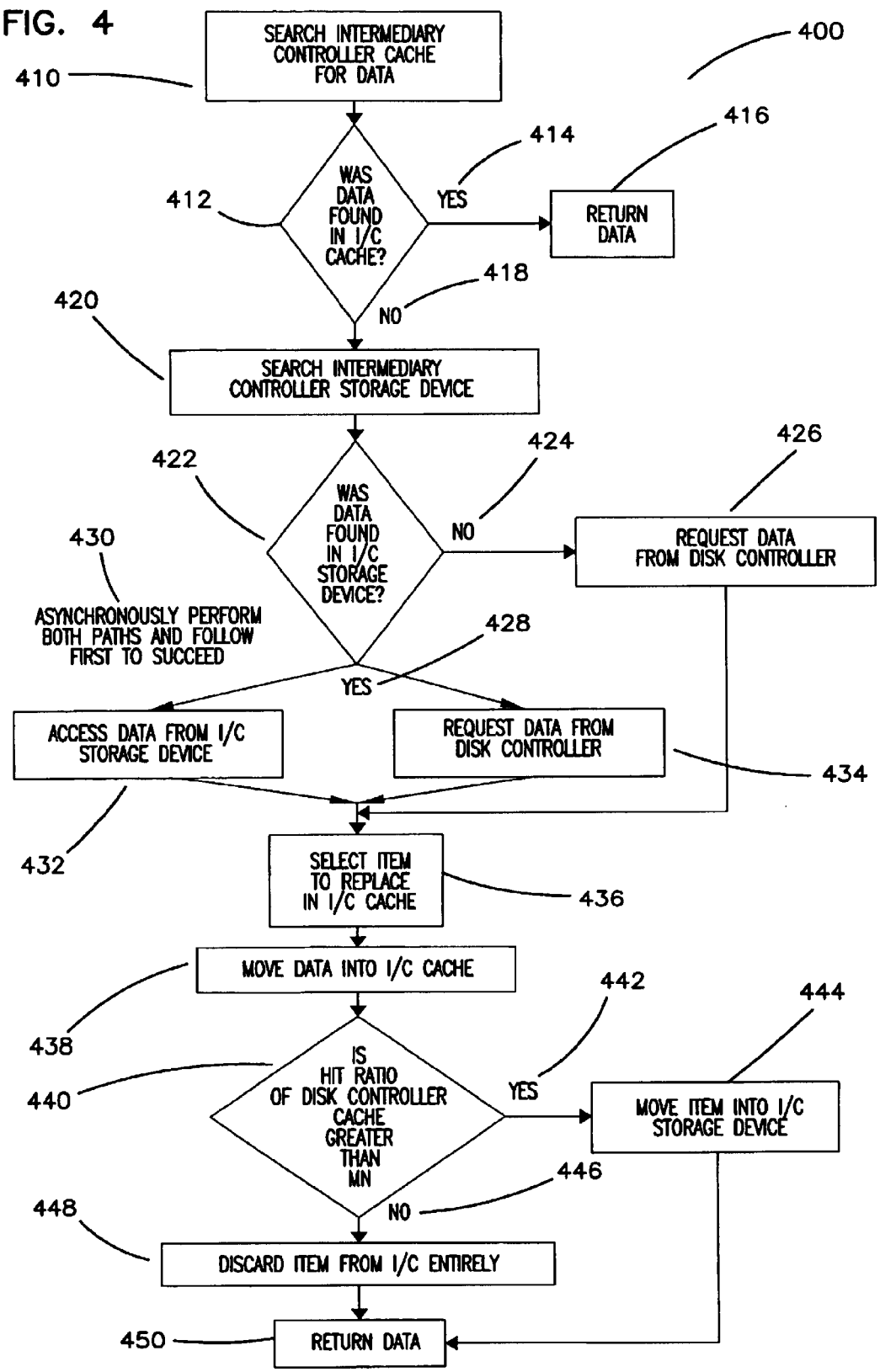
FIG. 4 illustrates a second embodiment of an expedient disk caching method according to the present invention.

FIG. 4 illustrates a flow chart of a second embodiment 400 of an expedient disk caching method according to the present invention. The second embodiment is similar to the first embodiment illustrated in FIG. 3 except that an asynchronous search procedure is utilized when the data is in the intermediary controller storage device.

In FIG. 4, the intermediary controller cache is first searched 410 to determine whether the requested data is located in the cache of the intermediary controller. A determination is made as to whether the requested data is located in the intermediary controller cache 412. If the data is located in intermediary controller cache 414, then the data is returned 416. If the data is not located in the intermediary controller cache 418, then the storage device of the intermediary controller is searched 420.

A determination is made as to whether the requested data is located in the intermediary controller storage device 422. If the data is not located in intermediary controller storage device 424, the data is requested from the legacy disk controller 426. If the data is located in the intermediary controller storage device 428, then an asynchronous search 430 for the data in the intermediary controller storage device 432 and in the disk controller 434 is performed and the first to succeed is used.

Next, an item is selected to replace in the intermediary controller cache 436. The data is moved into the intermediary controller cache 438. A cache hit ratio is maintained for the disk controller cache and the cache hit ratio is compared to a threshold MN 440. If the hit ration of the disk controller cache is greater than the threshold 442, the item is moved into the intermediary controller storage device 444. If the hit ration of the disk controller cache is not greater than the threshold 446, the item is discarded from the intermediary controller entirely 448. Then the data is returned 450.

Figure 5:
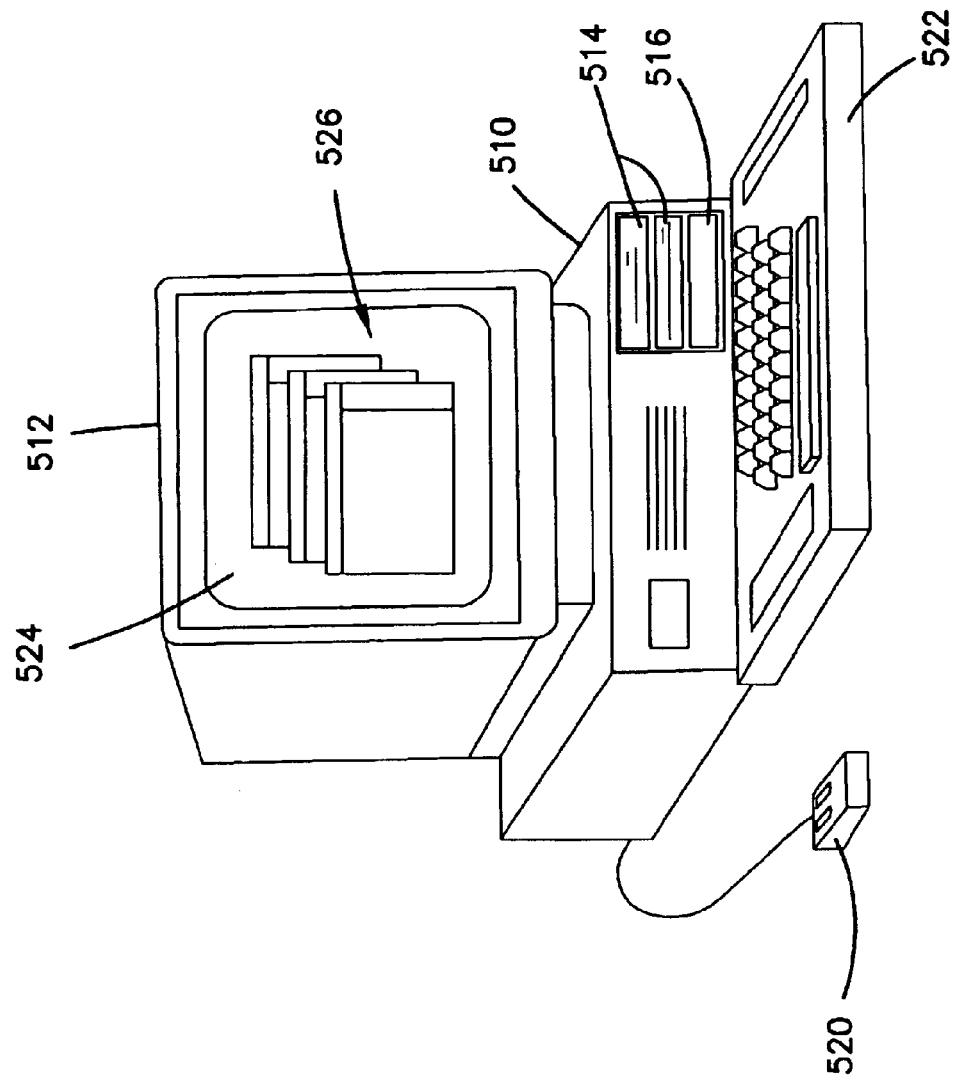
FIG. 5 is a block diagram that illustrates an exemplary hardware environment for controlling disk caching of an intermediary controller according to the present invention.

FIG. 5 is a block diagram 500 that illustrates an exemplary hardware environment for controlling disk caching of an intermediary controller according to the present invention. The present invention is typically implemented using a computer 510 comprised of a microprocessor, random access memory (RAM), read-only memory (ROM), and other components. It is envisioned that attached to the computer 510 may be a monitor 512, floppy disk drives 514, and CD-ROM drives 516. Also included in the preferred embodiment may be input devices, for example, a mouse pointing device 520 and a keyboard 522.

The computer 510 operates under the control of an operating system 524, such as the Windows, OS/2, Macintosh, or UNIX operating systems, which is represented in FIG. 5 by the screen display on the monitor 512. The computer 510 executes one or more computer programs 526, which are represented in FIG. 5 by the "windows" displayed on the monitor 512, under the control of the operating system 524. The present invention comprises a disk caching method for an intermediary controller that is preferably implemented in the operating system 524 and/or computer programs 526.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for disk caching for an intermediary controller, comprising:

asynchronously requesting a data record from both a intermediary controller disk storage and from a disk controller cache; and using a first received copy of the data record, the first received copy being a copy received first from the intermediary controller disk storage or a copy received from the disk controller cache.

2. A method for disk caching for an intermediary controller, comprising:

searching an intermediary controller cache to determine whether requested data is located in the cache of the intermediary controller;

searching a storage device of the intermediary controller to determine whether requested data is located in the storage device of the intermediary controller; and retrieving the requested data from a disk controller coupled to the intermediary controller when the requested data is not in the cache or storage device of the intermediary controller.

3. The method of claim 2 further comprising retrieving the requested data from the cache of the intermediary controller when the requested data is located in the cache of the intermediary controller.

4. The method of claim 3 further comprising retrieving the requested data from the storage device of the intermediary controller when the requested data is located in the storage device of the intermediary controller.

5. The method of claim 2 further comprising:

asynchronously requesting the requested data from both a intermediary controller disk storage and from a disk controller cache when the requested data is located in the storage device of the intermediary controller; and using a first received copy of the data record, the first received copy being a copy received first from the intermediary controller disk storage or a copy received from the disk controller cache.

6. The method of claim 2 further comprising retrieving the requested data from the storage device of the intermediary controller when the requested data is located in the storage device of the intermediary controller.

7. The method of claim 2 further comprising:

maintaining a cache hit ratio for cache in a disk controller cache; and choosing a cache method based upon a comparison of the hit ratio to a threshold.

8. The method of claim 7 further comprising:

selecting an item to replace in the intermediary controller cache;

moving data into the intermediary controller cache;

determining whether the hit ratio of the disk controller cache is greater than the threshold; and moving the item into the intermediary controller storage device when the hit ratio of the disk controller cache is greater than the threshold.

9. The method of claim 8 further comprising discarding the item from the cache of the intermediary controller when the hit ratio of the disk controller cache is not greater than the threshold.

10. The method of claim 9 further comprising returning the data.

11. A storage system, comprising:
   a host for issuing commands for reading and writing data records;
   a disk controller for access data records stored in legacy storage devices, the disk controller further comprising a legacy disk controller cache; and
   an intermediary controller, disposed between the disk controller and the host, for providing control to the host of the storage devices, the intermediary controller further comprising an intermediary controller cache and an intermediary controller disk storage device;
   wherein the intermediary controller searches an intermediary controller cache to determine whether requested data is located in the cache, searches a storage device of the intermediary controller to determine whether requested data is located in the storage device and retrieves the requested data from the disk controller cache when the requested data is not in the cache or storage device of the intermediary controller.

12. The storage system of claim 11 wherein the intermediary controller retrieves the requested data from the cache when the requested data is located in the cache of the intermediary controller.

13. The storage system of claim 9 wherein the intermediary controller retrieves the requested data from the storage device of the intermediary controller when the requested data is located in the storage device of the intermediary controller.

14. The storage system of claim 11 wherein the intermediary controller asynchronously requests the requested data from both an intermediary controller disk storage and from an disk controller cache when the requested data is located in the storage device of the intermediary controller, the intermediary controller using a first received copy of the data record, the first received copy being a copy received first from the intermediary controller disk storage or a copy received from the disk controller cache.

15. The storage system of claim 11 wherein the intermediary controller retrieves the requested data from the storage device of the intermediary controller when the requested data is located in the storage device of the intermediary controller.

16. The storage system of claim 11 wherein the intermediary controller maintains a cache hit ratio for cache in a disk controller cache and chooses a cache method based upon a comparison of the hit ratio to a threshold.

17. The storage system of claim 16 wherein the intermediary controller selects an item to replace in the intermediary controller cache, moves data into the intermediary controller cache, determines whether the hit ratio of the disk controller cache is greater than the threshold and moves the item into the intermediary controller storage device when the hit ratio of the disk controller cache is greater than the threshold.

18. The storage system of claim 17 wherein the intermediary controller discards the item from the cache of the intermediary controller when the hit ratio of the disk controller cache is not greater than the threshold.

19. The storage system of claim 18 wherein the intermediary controller returns the requested data to the host.

20. An article of manufacture for a intermediary disk controller, the article of manufacture comprising a computer readable medium having instructions for causing a computer to control the disk caching in a storage system, the method comprising the steps of:
   searching an intermediary controller cache to determine whether requested data is located in the cache of the intermediary controller;
   searching a storage device of the intermediary controller to determine whether requested data is located in the storage device of the intermediary controller; and
   retrieving the requested data from a disk controller cache coupled to the intermediary controller when the requested data is not in the cache or storage device of the intermediary controller.

21. The article of manufacture of claim 20 further comprising retrieving the requested data from the cache of the intermediary controller when the requested data is located in the cache of the intermediary controller.

22. The article of manufacture of claim 21 further comprising retrieving the requested data from the storage device of the intermediary controller when the requested data is located in the storage device of the intermediary controller.

23. The article of manufacture of claim 20 further comprising:
   asynchronously requesting the requested data from both a intermediary controller disk storage and from a disk controller cache when the requested data is located in the storage device of the intermediary controller; and
   using a first received copy of the data record, the first received copy being a copy received first from the intermediary controller disk storage or a copy received from the disk controller cache.

24. The article of manufacture of claim 20 further comprising retrieving the requested data from the storage device of the intermediary controller when the requested data is located in the storage device of the intermediary controller.

25. The article of manufacture of claim 20 further comprising:
   maintaining a cache hit ratio for cache in a disk controller cache; and
   choosing a cache method based upon a comparison of the hit ratio to a threshold.

26. The article of manufacture of claim 25 further comprising:
   selecting an item to replace in the intermediary controller cache;
   moving data into the intermediary controller cache;
   determining whether the hit ratio of the disk controller cache is greater than the threshold; and
   moving the item into the intermediary controller storage device when the hit ratio of the disk controller cache is greater than the threshold.

27. The article of manufacture of claim 26 further comprising discarding the item from the cache of the intermediary controller when the hit ratio of the disk controller cache is not greater than the threshold.

28. The article of manufacture of claim 27 further comprising returning the data.

* * * * *